United States Patent [19]

Siegel

[11] Patent Number: 5,341,623

[45] Date of Patent: Aug. 30, 1994

[54] FILM SEALING AND PACKAGING METHOD AND APPARATUS WITH ADJUSTABLE SEAL QUALITY

[75] Inventor: Martin Siegel, Englewood Cliffs, N.J.

[73] Assignee: Weldotron of Delaware, Inc., Wilmington, Del.

[21] Appl. No.: 966,818

[22] Filed: Oct. 26, 1992

Related U.S. Application Data

[63] Continuation-in-part of Ser. No. 725,009, Jul. 2, 1991, abandoned.

[51] Int. Cl.$^5$ .............. B65B 11/48; B65B 31/00; B65B 51/16; B65B 51/32
[52] U.S. Cl. ............................. 53/433; 53/450; 53/463; 53/479; 53/550
[58] Field of Search ............. 53/450, 451, 463, 433, 53/432, 550, 548, 511, 510, 479; 56/555, 583.1

[56] References Cited

U.S. PATENT DOCUMENTS

| | | |
|---|---|---|
| 2,160,367 | 6/1939 | Maxfield . |
| 2,822,653 | 2/1958 | Zinn, Jr. et al. . |
| 2,864,428 | 12/1958 | White ........................... 53/479 X |
| 2,893,468 | 7/1959 | Fieroh ........................... 53/479 X |
| 2,914,893 | 6/1959 | Berst . |
| 3,007,295 | 8/1961 | Heinzer . |
| 3,417,544 | 11/1968 | Grevich . |
| 3,958,390 | 5/1976 | Pringle, Jr. et al. . |
| 3,973,372 | 1/1976 | Omori ........................... 53/252 X |
| 4,035,984 | 7/1977 | Gerlach et al. . |
| 4,041,673 | 6/1977 | Brooke et al. . |
| 4,144,697 | 11/1979 | Suga ........................... 53/556 |
| 4,219,988 | 1/1990 | Shanklin et al. ........................... 53/550 |
| 4,402,172 | 9/1983 | Krueger ........................... 53/479 X |
| 4,548,024 | 4/1985 | Fine ........................... 53/502 |
| 4,553,377 | 10/1985 | Klinkel ........................... 53/550 X |
| 4,630,429 | 4/1986 | Christine ........................... 53/479 |
| 4,658,569 | 2/1987 | Hanagata ........................... 53/550 |
| 4,722,168 | 6/1988 | Heaney ........................... 53/450 |
| 4,807,426 | 4/1989 | Smith ........................... 53/550 |
| 4,872,302 | 2/1989 | Van Eijsden et al. ........................... 53/441 |
| 4,895,611 | 4/1990 | Bryniarski et al. ........................... 156/252 |
| 4,956,963 | 11/1990 | Johnson . |
| 5,042,229 | 5/1991 | Hirose ........................... 53/450 |

*Primary Examiner*—James F. Coan
*Attorney, Agent, or Firm*—Davis Hoxie Faithfull & Hapgood

[57] ABSTRACT

A form fill packaging and sealing apparatus comprises a film dispenser and a film forming plow which, together with a roller guide, forms the film to be sealed into a tube with the free edges at the side. The object to be packaged is inserted into the film tube. The free edges of the film are longitudinally sealed together at the side of the package by a rotary heat sealer and immediately cooled to approximate impulse sealing. The quality and width of the longitudinal seal can be adjusted by changing the amount that the film is preheated before sealing. A cross seal is made at the front and back of the object to be packaged. The excess gas in the package is pressed out by a presser before the back cross seal is made.

49 Claims, 12 Drawing Sheets

FILM SEALING AND PACKAGING METHOD AND APPARATUS WITH ADJUSTABLE SEAL QUALITY

RELATED APPLICATION

The present application is a continuation-in-part application of copending U.S. Ser. No. 07/725,009, filed on Jul. 2, 1991 by Martin Siegel and now abandoned. The present application hereby incorporates the entire disclosure of U.S. Ser. No. 07/725,009 by reference. The present application and U.S. Ser. No. 07/725,009 have been commonly assigned to Weldotron, Inc., a Delaware corporation.

FIELD OF THE INVENTION

The present invention relates to the field of packaging methods and devices, and more particularly to form-fill packaging and sealing machines and methods and film sealing mechanisms.

BACKGROUND OF THE INVENTION

Products, especially foods, are often packaged in film for sale to consumers. The film typically is wrapped around the product, bringing the edges of the film together forming a tube. The edges are sealed between rollers by pressure and heat, forming a lap seal. The ends of the tube are also sealed with pressure and heat, forming a cross seal. Such packaging and sealing techniques are used, for example, in modified atmosphere packaging, or MAP, also known as controlled atmosphere packaging, or CAP. In MAP, a product is wrapped in a film that is impervious to certain gasses, such as $NO_2$ or $CO_2$. A hermetic lap seal is formed. One end of the tube is hermetically cross sealed. The selected gas is then injected into the tube, blowing out the air. The selected gas inhibits the growth of bacteria and thus increases shelf life.

In all film packaging, whether MAP or otherwise, the quality of the seal is affected by the temperature of the film. The film must be at a sufficient temperature that it bonds when it is pressed together.

The width desired for the seal is affected by the product itself. A wider seal reduces leakage and increases package strength. A thinner seal reduces film used, makes a package easier to open, and gives the package a cleaner, tighter look which is important in a point of sale display. A wider seal is achieved by increasing the temperature of the film when it is pressed together.

Merely increasing the temperature of the heated rollers, whether to increase the quality or width of the seal, may result in burning the film. It is therefore desirable to increase the temperature of the film at sealing without increasing the temperature of the rollers.

It has been found that preheating the film can improve the seal by assuring that the film is at a certain temperature such that a seal of a desired quality will form. Further, heat seals are made wider when the film is preheated for a time before sealing. The seal can be of higher quality and wider by increasing the amount of preheating. Prior art sealing machines have not had an effective or convenient way of preheating the film. Further, there has not been a way of adjusting the amount of preheating to affect the width or quality of the seal.

U.S. Ser. No. 07/725,009 discloses a method and apparatus for sealing film by passing the film between sealing rollers, at least one of which is heated. To improve the seal, the film is preheated by laying it against the heated sealing roller before pressing the film between both sealing rollers. Since the film is preheated, a seal of higher quality and desired width results.

OBJECTS AND SUMMARY OF THE INVENTION

It is therefore an object of the present invention to overcome the shortcomings of prior art form fill packaging and sealing machines and methods.

It is a further object of the invention to conserve film in stretch and stretch/shrink film wrapping applications.

It is a further object of the invention to provide an effective and convenient way of preheating film before sealing.

It is a further object of the invention to provide an effective and convenient way of changing the amount of preheating to affect the quality of the seal.

It is a further object of the invention to provide an effective and convenient way of changing the amount of preheating to affect the width of the seal.

In accordance with one aspect of the present invention, a mechanism and method of varying the quality and width of a seal is provided. The film is sealed by pressure and heat applied between a heated sealing roller and a sealing bed roller. To increase the quality of the seal and to widen the seal, the film is pressed against the heated sealing roller for a portion before it is sealed, thus preheating the film. To adjust the quality and width of the seal, the heated sealing roller can be moved such that the film is pressed against a larger or smaller portion of the heated sealing roller, thus altering the amount of preheating.

BRIEF DESCRIPTION OF THE DRAWINGS

These and other objects, aspects, and embodiments of the present invention will be described with reference to the following drawing figures, of which.

DETAILED DESCRIPTION OF THE INVENTION

Figure 1:
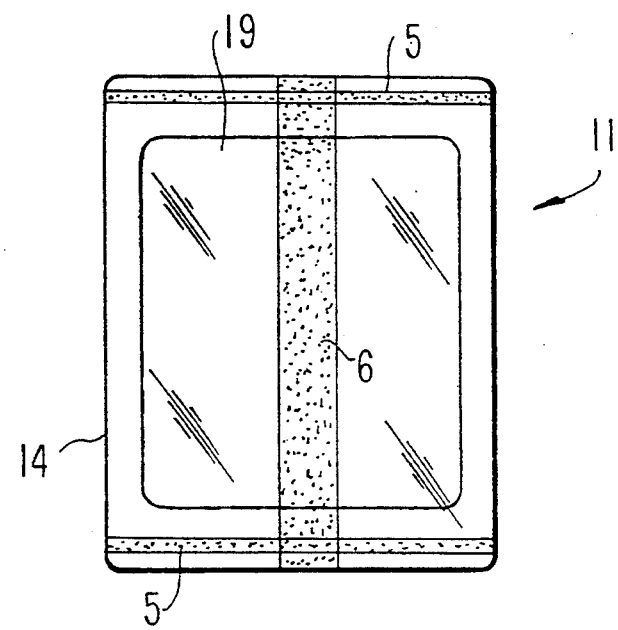
FIG. 1 is a bottom plan view of a package with a bottom seal formed from a tube of sealing film.
Figure 2:
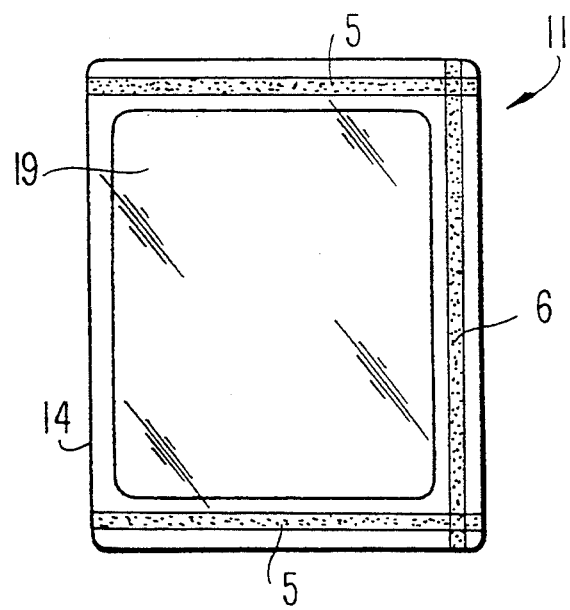
FIG. 2 is a bottom plan view of a package with a side seal formed from a tube of sealing film.

As shown in FIGS. 1-2, a package 11 formed by a typical form-fill packaging and lap sealing machine comprises a tube of film 14 formed around an item or product 19. The edges of the film meet in a longitudinal seam. In FIG. 1, the seam is located along the bottom of the item 19. In FIG. 2, the seal is located along the side of the item 19. The seam is sealed to form a lap seal 6. When the seal 6 is located at the bottom of the item 19, it is then folded flat against the package 11. Cross seals 5 are then made at the ends of the package 11. When the film 14 is heat shrink film, the package 11 then goes to a heat shrink tunnel 200 (see FIG. 3) where the film is shrunk.

The package 11 shown in FIG. 2 presents several advantages over the package 11 in FIG. 1. Since the longitudinal seal 6 is formed on the side of the package 11, labels can be applied to the bottom surface. Since the longitudinal seal 6 need not be folded over, the cross seals 5 are formed only through two layers of film, which improves seal quality.

As described below, the longitudinal seal 6 is formed by preheating the film 14, and then by heating and pressing the film together. The quality of the longitudinal seal 6 is increased by increasing the amount of preheating. Increasing preheating also produces a wider seal which is less susceptible to leaking. For some applications, the seal quality will be sufficient with less preheating and a thinner seal will be adequate. Thus, the amount of preheating can be reduced. The sealing mechanism of the present invention can be used to form longitudinal seals of any type, including but not limited to those shown in FIGS. 1-2.

Figure 3:
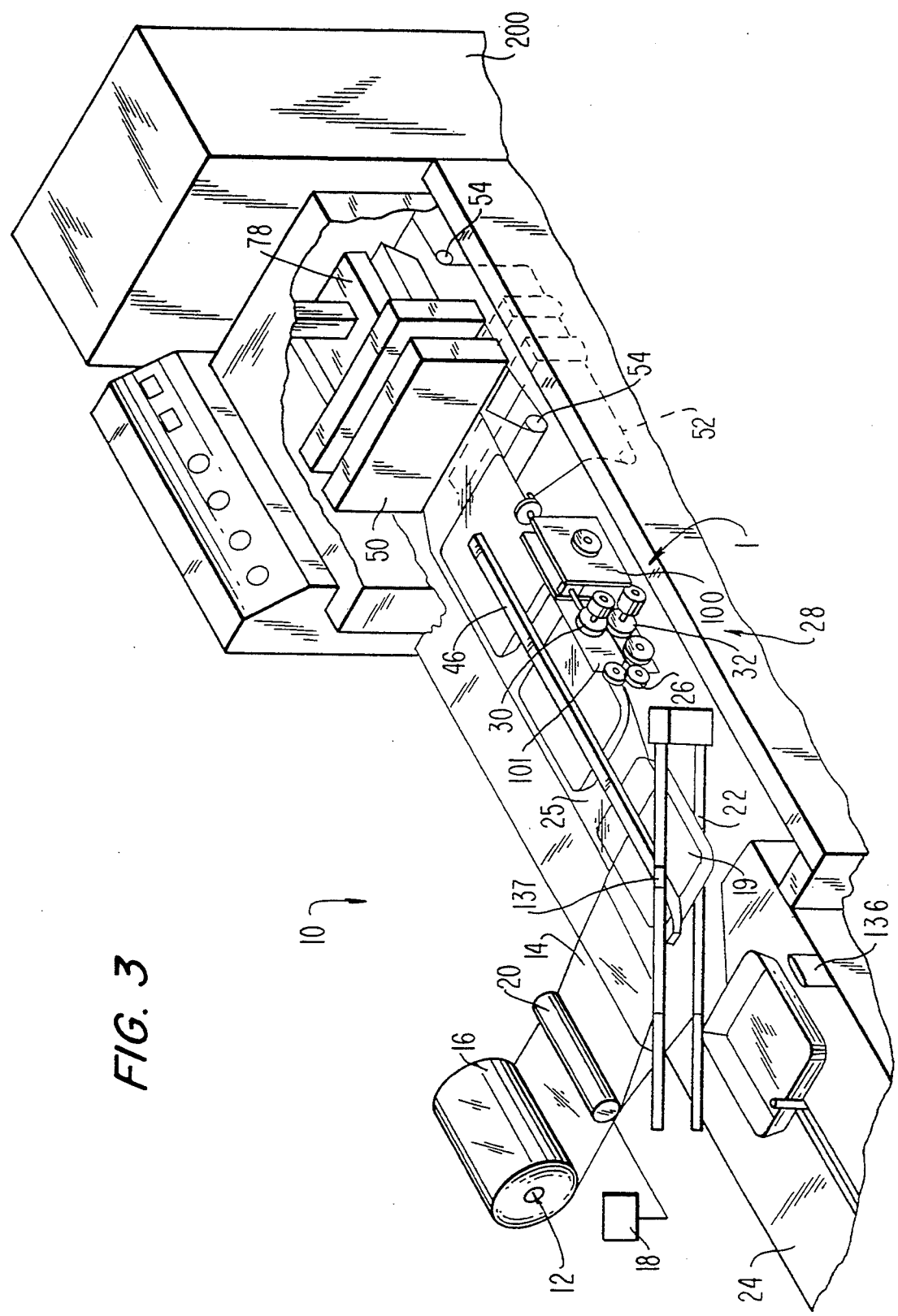
FIG. 3 is a perspective view of an example of a form fill packaging and sealing apparatus according to the present invention showing a first embodiment of a sealing mechanism.
Figure 4:
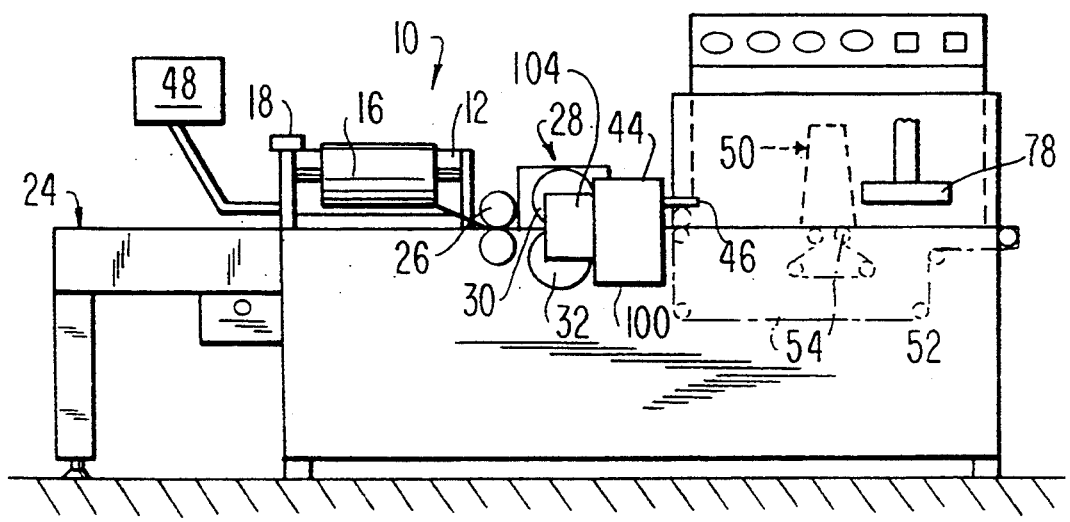
FIG. 4 is a front elevational view of the form fill packaging and sealing apparatus of FIG. 3.
Figure 5:
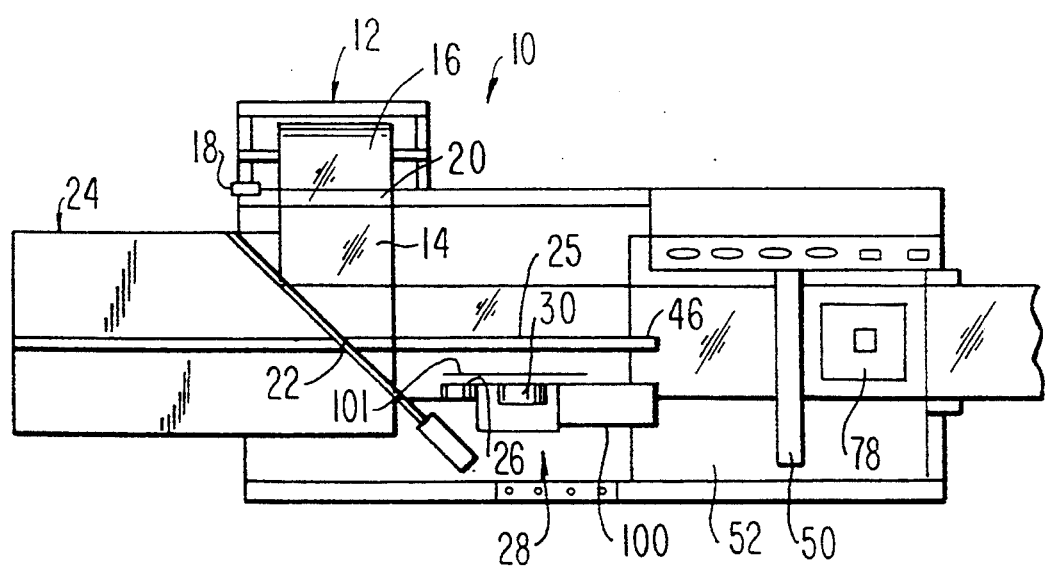
FIG. 5 is a top plan view of the form fill packaging and sealing apparatus of FIG. 3.

Referring now to FIGS. 3-5, the present invention is shown in connection with a form-fill packaging and sealing machine 10. The machine 10 is of the continuous flow and horizontal type, and has moderate speeds of up to 40-60 packages per minute. It will be appreciated, however, that the present invention can be used in other sealing apparatuses as well, including, but not limited to, vertical form-fill machines and high speed wrapping machines. The machine 10 is intended to be used primarily for MAP packaging using barrier films, but other types of shrink films may also be used if desired. It has also been found that stretch films can advantageously be used with the machine 10 to economize film, as will be further described below.

A film dispenser 12 situated behind the machine 10 dispenses center-folded heat-sealable film 14 from a roll of film 16. As shown, the dispenser 12 is used with previously center-folded film, but single wound film may also be used with appropriate modifications to the dispenser 12, as is known in the art. When the machine 10 is used for MAP applications, the film 14 is preferably one of many types of commercially available coextruded multilayer shrink barrier films.

If the film 14 is printed, an electronic detector 18, located on the film dispenser 12, is used to ensure that the film 14 registers with the objects to be packaged, "register" meaning properly aligning the print on the film 14 with the items 19 to be packaged. Devices other than the detector 18 may be used to accomplish the same function, as is known in the art.

One or more roller guides 20, used to ensure that the film 14 leaves the film dispenser 12 sufficiently straight and taut, are disposed in front of the film roll 16. A film forming plow 22 is located in front of the roller guide 20. The film forming plow 22 turns the path of the film 14 at a right angle and spreads the film layers apart, causing the fold in the film to be disposed toward the back of the machine 10 and readying the film 14 to receive an item 19, shown in FIG. 3. As described more fully below, a first package sensor 137, preferably an optical sensor, is mounted on the film forming plow 22, which sends a signal to activate the machine 10 when the item 19 is sensed. A flighted chain lug conveyor 24 transfers the item 19 to the film forming plow 22 between the top and bottom layers of the film 14, and registers the placement of the items 19 so that the cross seal of the machine 10 will occur in the proper place between the items 19. Alternatively, the products may be fed manually by an operator. A second package sensor 136, preferably an optical sensor, is mounted adjacent to lug conveyor 24 which sends a signal to activate a film sealing mechanism and the film dispenser 12 when a package is sensed. A conveyor belt 25 carries the items 19, with their surrounding film 14, from the plow 22 to the other sections of the machine 10.

A roller guide 26 at the free edges of the film 14 is driven to catch the edges of the film and form the film into a tube around the items 19. The roller guide 26 is disposed downstream from the plow 22, "downstream" as used herein meaning farther along the direction in which the package moves through the machine 10. The guide 26 is angled slightly to pull the film 14 away from the item 19, tightening the film, in order to avoid folds caused by slackness, and to align the edges of the film. The edges of the film 14 then move into a longitudinal seal section, indicated generally at 28, comprising a film sealing mechanism. The film sealing mechanism 1 includes a housing 100 removably attached to the machine 10. The film sealing mechanism also includes a heated sealing roller 30 pressed against a sealing bed roller 32, the interaction of which effects a continuous thermal seal in the edges of the film 14, to the side of the item 19.

Figure 6:
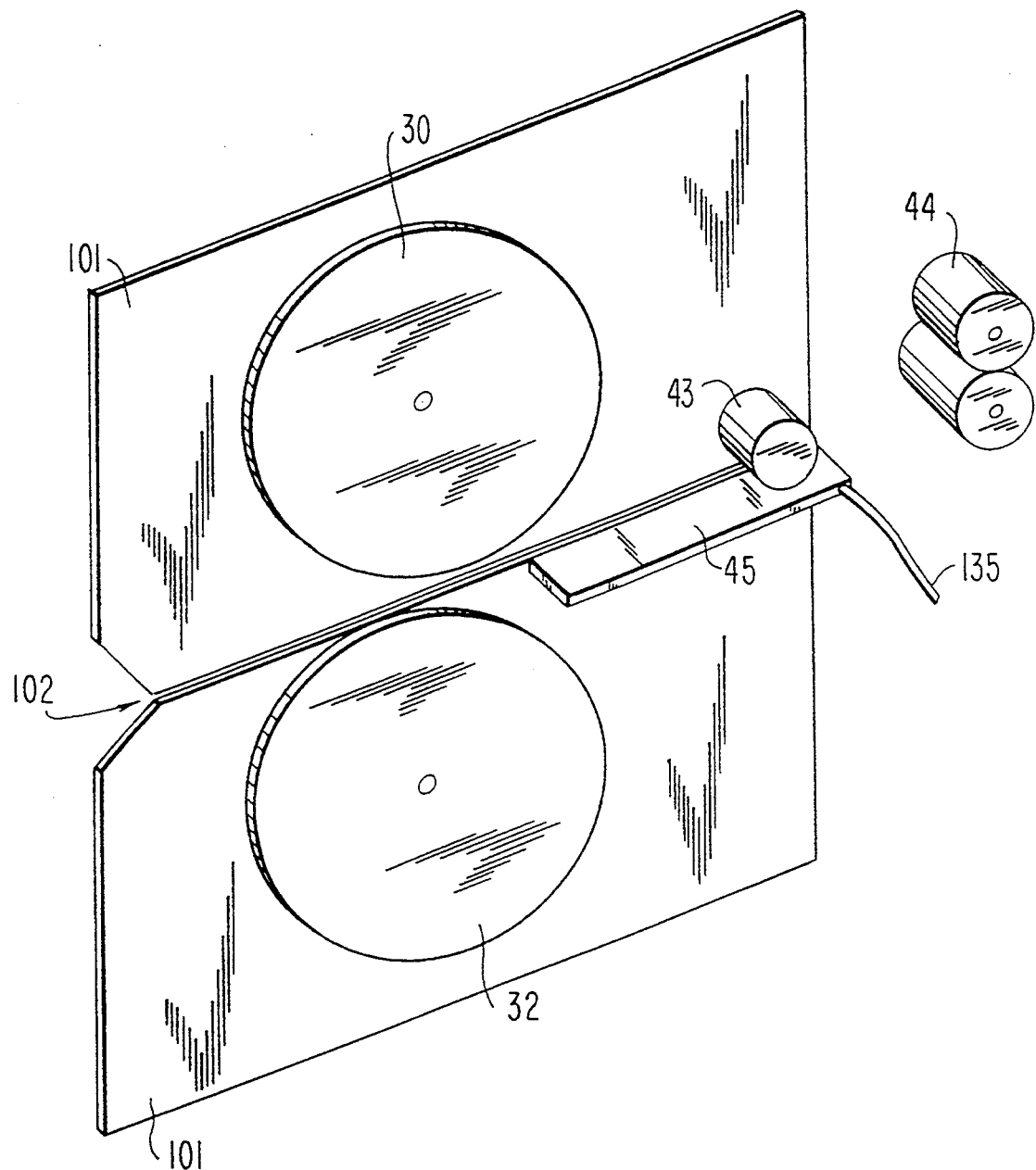
FIG. 6 is a perspective view of the sealing and cooling means of the sealing mechanism of FIG. 3 shown in isolation.

As seen more clearly in FIG. 6, a cooling shield 101 is disposed adjacent to the heated sealing roller 30 and the sealing bed roller 32. A slot 102 extends through the cooling shield 101. The film 14 is guided from the roller guide 26 to the slot 102 of the cooling shield 101. The cooling shield 101 prevents the film 14 around item 19 from contacting the heated sealing roller 30. The slot 102 also helps keep the edges of the film 14 together while they are being sealed.

A cooling roller 43 pressing against a cooling plate 45 is disposed downstream from the sealing rollers 30, 32. A cooling roller assembly 44 is located downstream of cooling roller 43. The cooling roller assembly 44 may be mounted on the housing 100. After sealing, the film 14 travels between the cooling roller 43 and the cooling plate 45 and then to the cooling roller assembly 44. The cooling plate 45 can be formed as part of the cooling shield 101, attached near slot 102 downstream of the heated sealing roller 30. Coolant, preferably air, enters the cooling plate 45 through a coolant input line 135 and flows through the coolant shield 101. The cooling roller 43 and the plate 45 serve as an alternative and/or additional cooling apparatus to cooling roller assembly 44, which is water chilled in the preferred embodiment. The sealing bed roller 32 can also be cooled, thus cooling the seal immediately after forming it.

Although the seal made in the longitudinal seal section 28 is technically a thermal seal, it approximates an impulse seal since the seal is cooled soon after it is made. The seal thus is hermetic, or nearly so. If desired, the excess film can be trimmed from the seal, as is known in the art.

Figure 7:
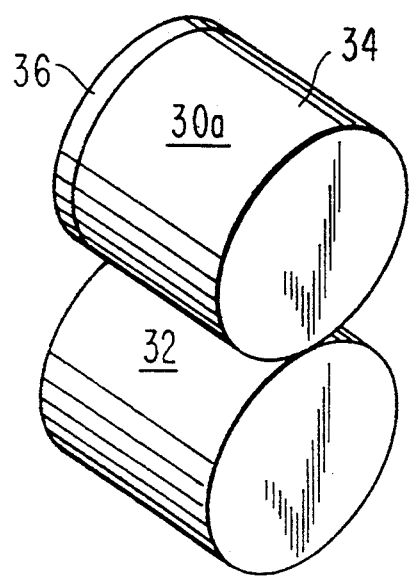
FIG. 7 is a perspective view of an example of a side sealing roller used in the form fill packaging and sealing apparatus of FIG. 3.
Figure 8:
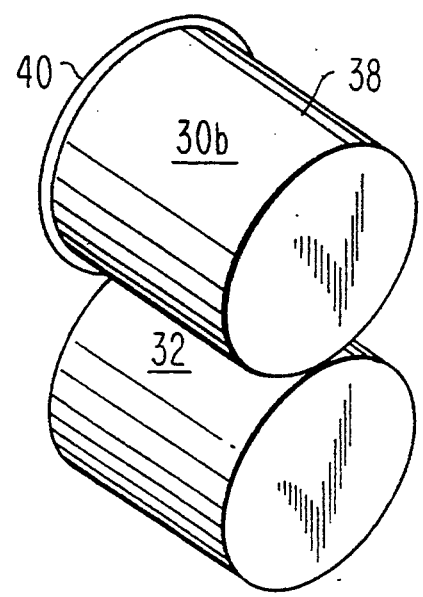
FIG. 8 is a perspective view of another example of a side sealing roller used in the form fill packaging and sealing apparatus of FIG. 3.
Figure 9:
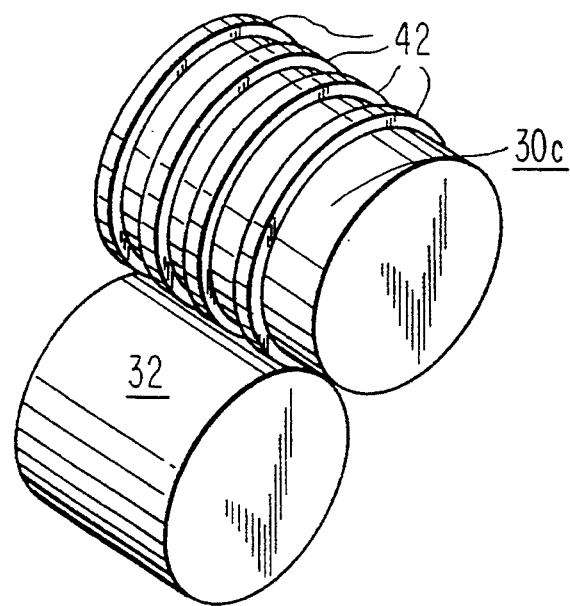
FIG. 9 is a perspective view of yet another example of a side sealing roller used in the form fill packaging and sealing apparatus of FIG. 3.

Different types of sealing rollers 30 (also known as wheels or discs) may be used, as desired, three of which are depicted in FIGS. 7-9. Preferably, these rollers 30 are made of nickel-chromium and coated with Teflon. In FIG. 7, a sealing roller 30a has a heating section 34 and a flat sealing edge 36. The heating section 34 heats the sealing edge 36, and the sealing edge 36 seals the film 14 against the sealing bed 32. In FIG. 8, a sealing roller 30b has a heating section 38 and a sharp sealing edge 40. The sharp sealing edge 40 accomplishes a narrower seal than the flat sealing edge 36 in FIG. 7. In FIG. 9, a sealing roller 30c comprises four flat sealing sections 42 spaced apart from each other, each of which performs a separate seal.

Referring to FIGS. 10-16, three examples of sealing mechanisms in accordance with the present invention seal the film 14 by subjecting it to heat and pressure at a sealing point 103 between a heated sealing roller 30 and a sealing bed roller 32. To improve the quality and width of the seal, the film 14 can be preheated before it reaches the sealing point 103. Preheating is accomplished by placing the film 14 in thermal contact with the heated sealing roller 30 before the sealing point 103. The amount of preheating is adjusted by increasing or decreasing the period that the film 14 is in thermal contact with the heated roller 30.

Figure 10:
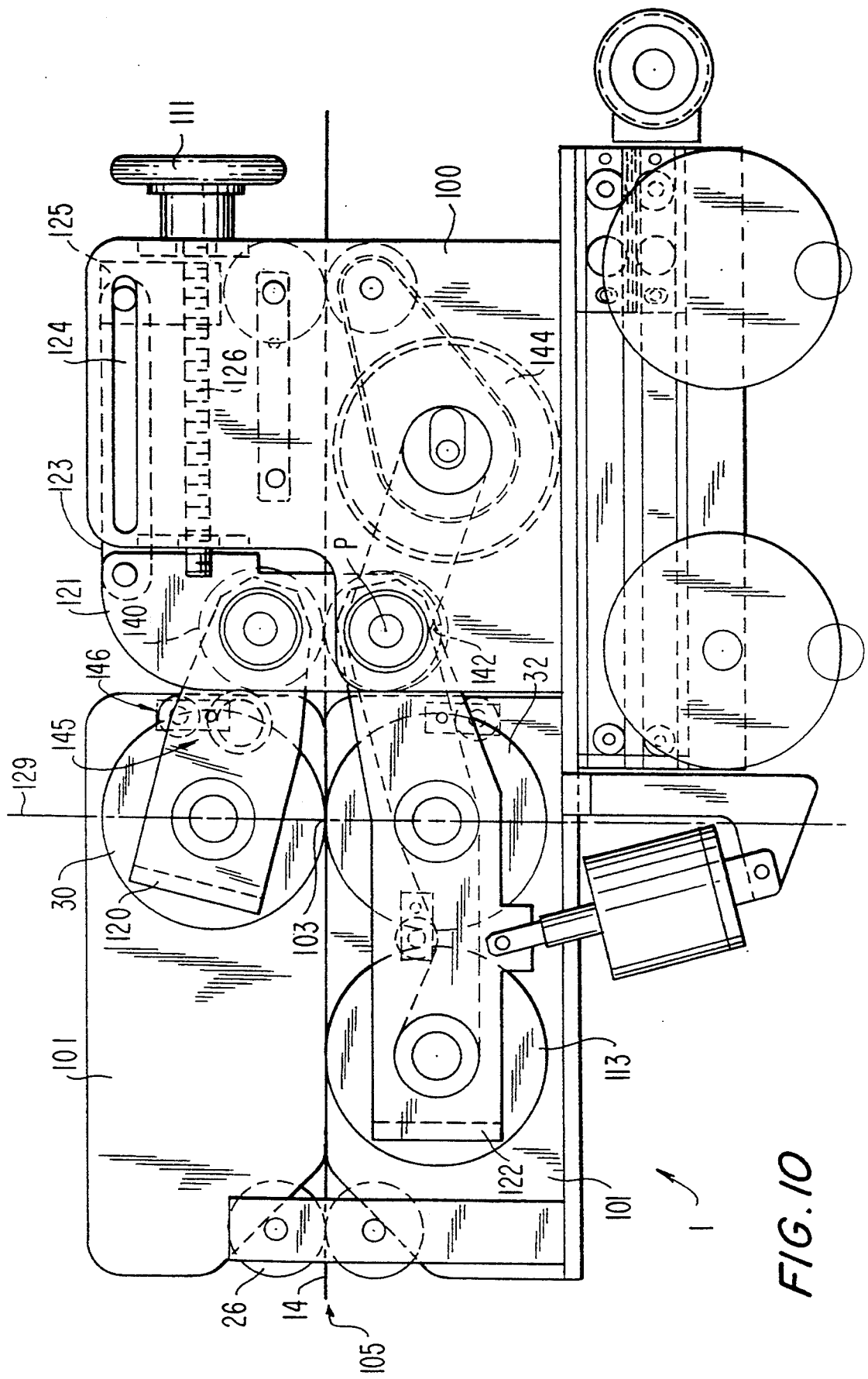
FIG. 10 is a side view of the first example of the sealing mechanism in the closed position with no preheating.
Figure 13:
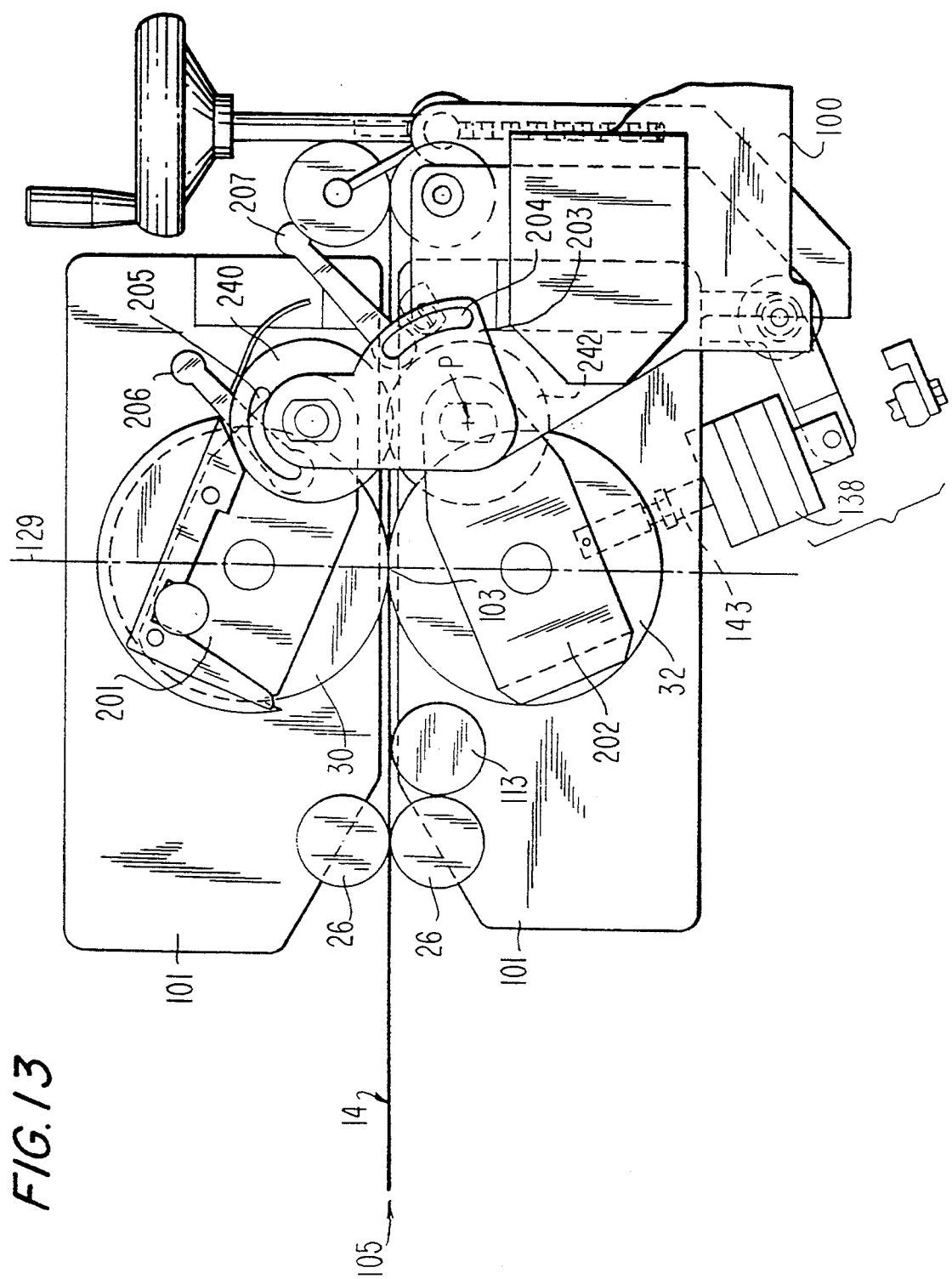
FIG. 13 is a side view of the second example of the sealing mechanism in the closed position with no preheating.
Figure 16:
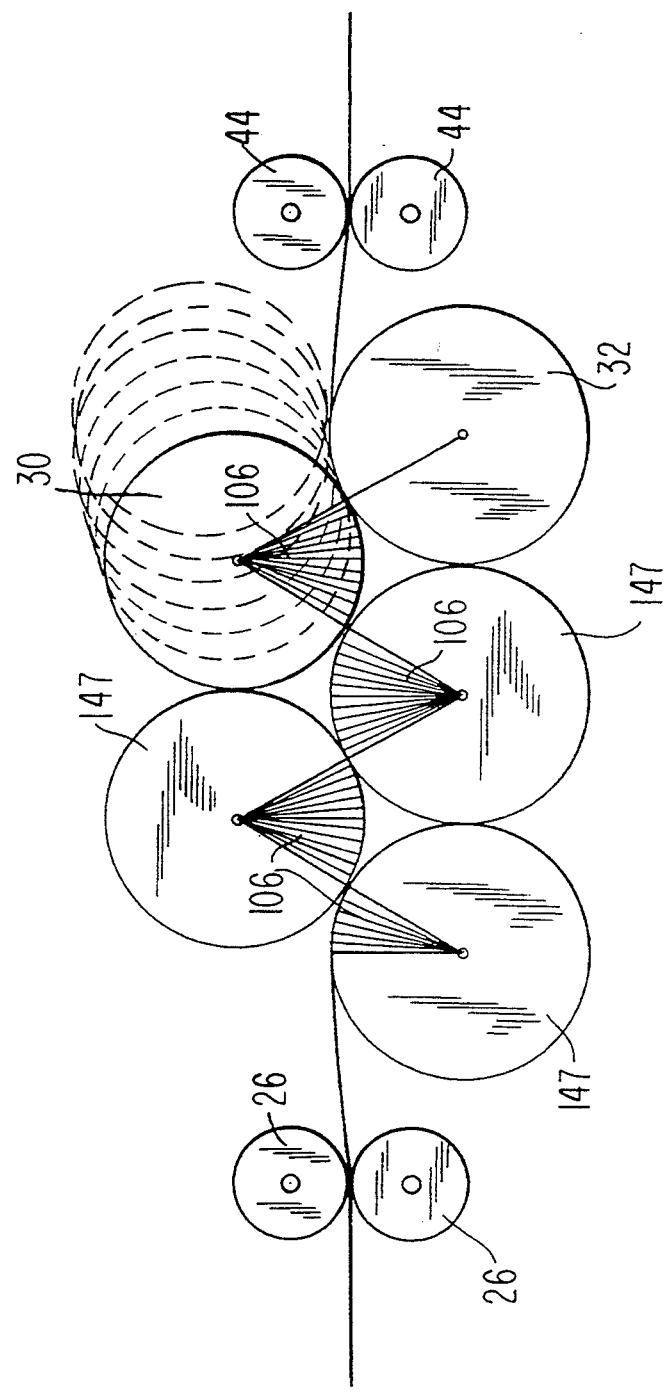
FIG. 16 is a schematic view of the sealing mechanism with cascading heated sealing rollers.

The film 14 travels along a film path 105 through the film sealing mechanism. To perform a seal without preheating, the heated sealing roller 30 is positioned directly above the sealing bed roller 32, as shown in FIGS. 10, 13 and 16. As the film 14 travels along film path 105, it does not contact the heated sealing roller 30 until at or directly before the sealing point 103.

Figure 11:
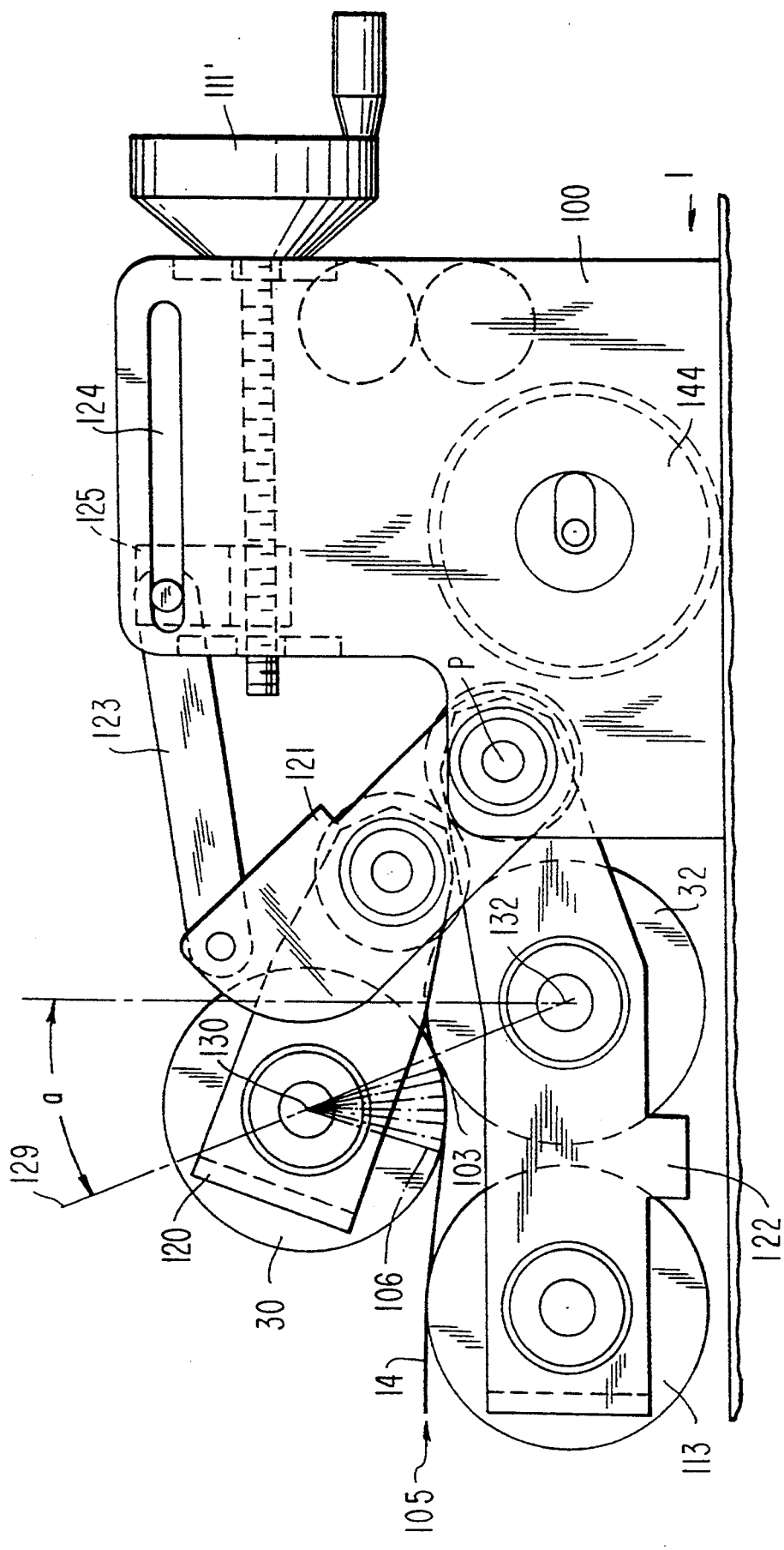
FIG. 11 is a side view of the first example of the sealing mechanism in the closed position with preheating.
Figure 14:
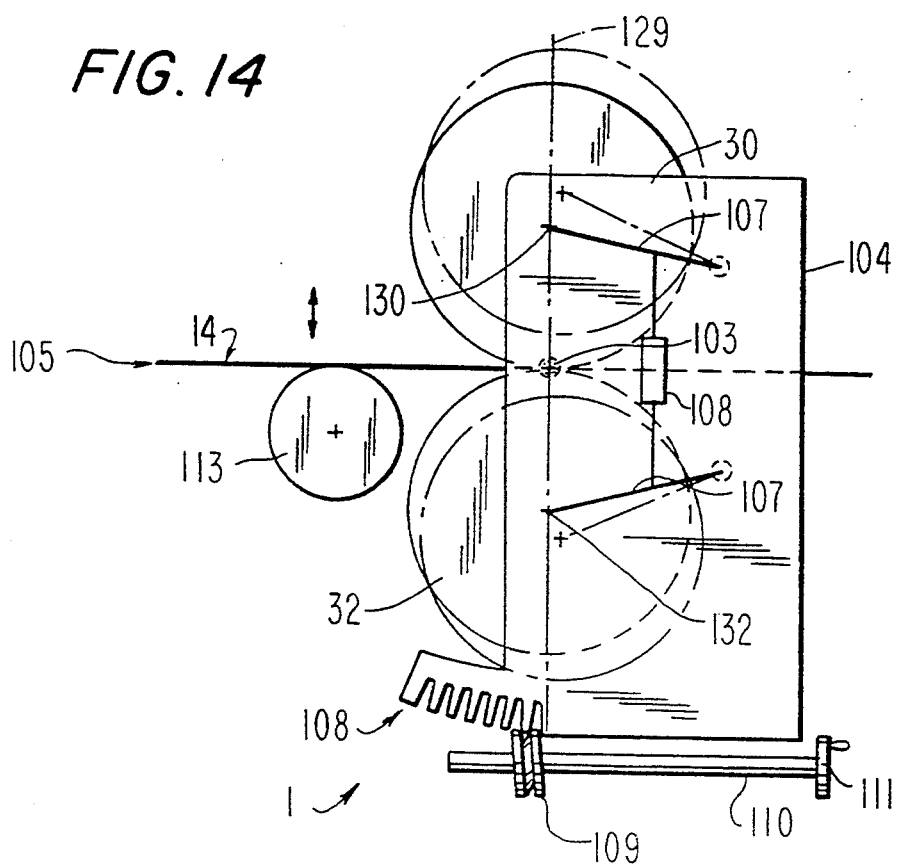
FIG. 14 is a side view of a third example of the sealing mechanism in the closed position with no preheating.

To preheat the film 14, the heated sealing roller 30 is moved into the film path 105 as shown in FIGS. 11 and 14. Tension in the film 14 places it in thermal contact with a portion 106 (shaded) of the heated sealing roller 30 before the film reaches sealing point 103. When the film 14 is in thermal contact with the heated sealing roller 30, it is being preheated. The larger the portion 106 of the heated sealing roller 30 that the film 14 lies on before reaching the sealing point 103, the greater the preheating and the thicker and the higher quality of the seal. Thus, to adjust preheating, the heated sealing roller 30 is moved toward and away from the film path 105.

Figure 12:
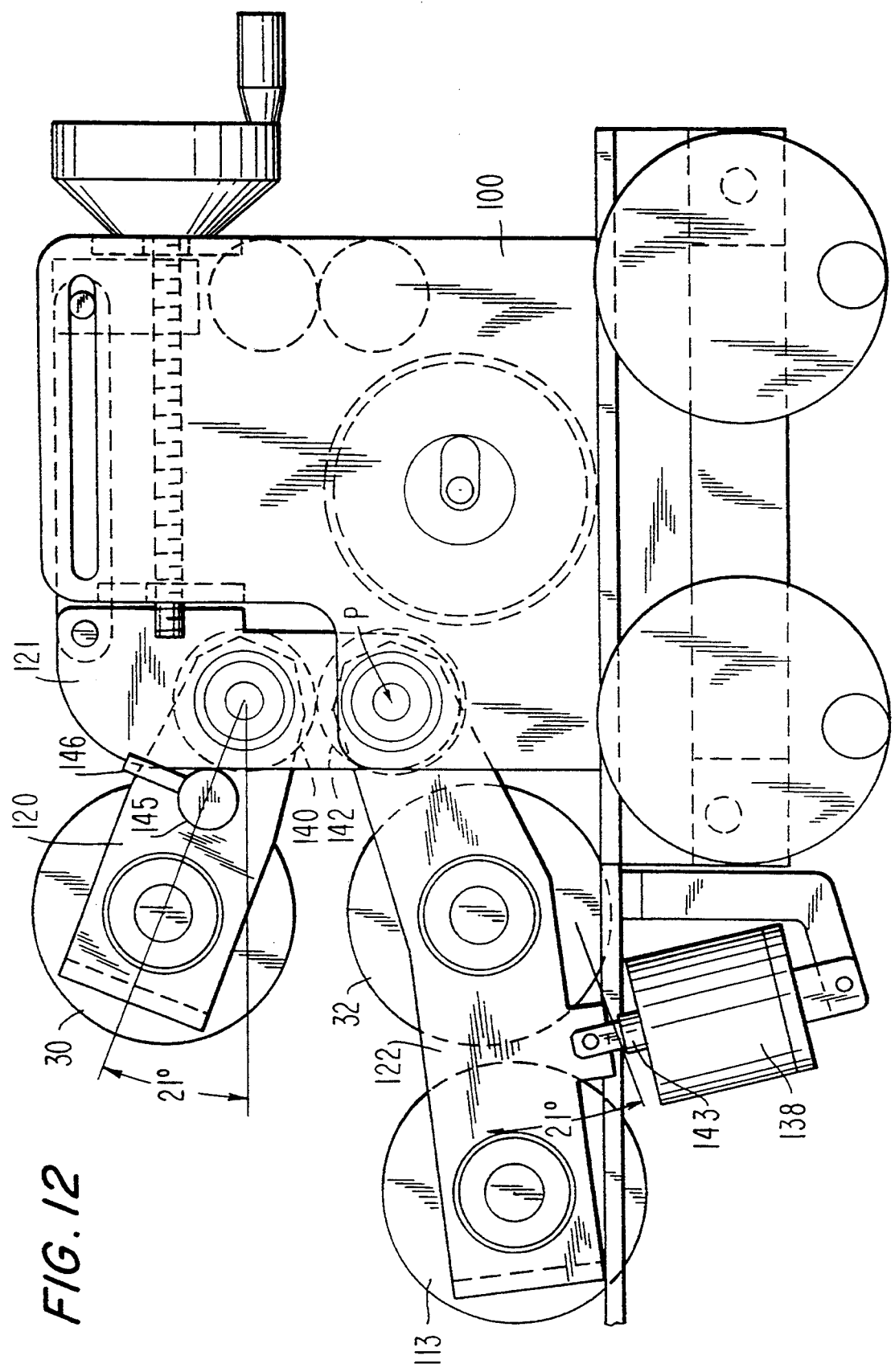
FIG. 12 is a side view of the first example of the sealing mechanism in the open position.

One example of a sealing mechanism in accordance with the present invention is shown in FIGS. 10-12. The heated sealing roller 30 is mounted on a sliding arm 120. The sliding arm 120 is mounted on a driving arm 121. The driving arm 121 is pivotally mounted to the housing 100 of the sealing mechanism at point P. A bed arm 122 is also pivotally mounted to the housing device 100 about the same point P as the driving arm 121. The sealing bed roller 32 is rotatably mounted to the bed arm 122. A bias roller 113 is also mounted on the bed arm 122, upstream of the bed sealing roller 32. The sealing rollers 30, 32 are driven by a motor-driven sprocket 144 via a chain drive, all part of the film sealing mechanism. The sealing rollers 30, 32 could also be driven by a motor in machine 10.

The film 14 travels along the film path 105 between the rollers 30, 32. The centers 130, 132 of the sealing rollers 30, 32 respectively define a roller axis line 129. The roller axis line 129 is at an angle, a, with respect to a vertical axis (see FIG. 11). As shown in FIG. 10, the roller axis line 129 is vertical (i.e., a=0°). The film 14 does not ride along the heated sealing roller 30 before it is subjected to heat and pressure between the sealing rollers 30, 32, and there is no preheating. As shown in FIG. 11, however, the roller axis line is at an angle "a" with respect to the vertical and the film 14 is therefore preheated during the time that it is in thermal contact with roller 30, at portion 106. The adjustment of angle "a" will be described below.

As seen in FIGS. 10-11, the mechanism is in the closed position for sealing (i.e., the sealing rollers 30, 32 have been brought together). Before the film 14 can be sealed, it must be threaded through the sealing mechanism 1. This is accomplished by separating the sealing rollers 30, 32. Referring to FIG. 12, a sliding arm gear 140 is rotatably attached to sliding arm 120. The sliding am gear 140 can be locked so that it is fixed with respect to the sliding arm 120. A locking gear 145 is rotatably mounted to the sliding arm 120 and engaged with the sliding arm gear 140. During normal operation of the mechanism, the sliding arm gear 140 is locked to the sliding arm 120, by tightening lock 146 which fixes the locking gear 145 to the sliding am 120. Since the sliding arm gear 140 is engaged to the locking gear 145, the sliding arm gear is also fixed with respect to the sliding arm 120. A bed arm gear 142, which is in engagement with gear 140, is fixedly mounted to the bed arm 122.

To thread the film 14, rollers 30 and 32 are separated by activating hydraulic cylinder 138, which pulls the bed arm 122 down. This causes bed arm gear 142 to rotate counterclockwise as seen in FIG. 12. The rotation of the bed arm gear 142 causes the sliding arm gear 140 to rotate clockwise because the gears are engaged. Since the sliding arm gear 140 is locked to the sliding arm 120, the sliding arm also rotates clockwise, lifting the heated sealing roller 32. Consequently, by activating hydraulic cylinder 138, the sealing bed roller 32 is lowered and the heated sealing roller 30 is raised, creating room for the film 14. Once the film 14 is in place, the process is reversed such that the sealing bed roller 32 and heated sealing roller 30 are adjacent each other. A pressure spring 143 connects the hydraulic cylinder 138 to the bed arm 122, limiting the force that the cylinder exerts on the bed arm.

The cylinder 138 is also activated when the first sensor 137 does not sense an item 19. In this way, the sealing rollers 30, 32 pull away from the film 14 and the film is not held overlong on the heated sealing roller 30, and thus the film is not burned. Once the second sensor 137 detects an item 19, the cylinder 138 pushes bed sealing arm 122 up which, as described above, causes the sealing rollers 30, 32 to come together.

The adjustment of angle "a" will now be described. To increase or decrease the amount of preheating, the angle "a" is increased or decreased by rolling the heated sealing roller 30 over the sealing bed roller 32 by moving sliding arm 120 as seen in FIG. 11. An adjustment rod 123 is pivotally attached at one end to driving arm 121. The other end of the adjustment rod 123 rides in a carriage 125 along an adjustment slot 124. Carriage 125 is operably engaged to screw 126 which is attached to handcrank 111. In preparation for this operation, the sliding arm gear 140 is first unlocked by disengaging bolt 146 from gear 145, so that the sliding arm 120 may move freely without interference from the bed arm gear 142. Then, the handcrank 111 is turned, causing the carriage 125 to move along slot 124. The handcrank 111 could also be rotated by a computer-controlled motor (not shown). As the carriage 125 moves, the adjustment rod 123 is moved and the driving arm 121 is rotated about point P. As the driving arm 121 rotates, sliding arm 120 is also moved, and the heated sealing roller 30 is displaced. Since the sliding arm 120 is free to rotate with respect to the driving arm 121, gravity keeps the heated sealing roller 30 in contact with the sealing bed roller 32. If the sealing mechanism was used at some other orientation, a spring or other biasing means could be used to keep the sealing rollers 30, 32 in contact. Once the roller axis line 129 is at the desired angle "a", the sliding arm gear 140 is locked by engaging bolt 146 with gear 145.

A second example of the sealing mechanism in accordance with the present invention is shown in FIG. 13. The heated sealing roller 30 is rotatably mounted on an upper arm 201. The upper arm 201 is pivotally mounted on an adjustment arm 203. The adjustment arm 203 is pivotally mounted to the housing 100 of the sealing mechanism at point P. A lower arm 202 is also pivotally mounted to the housing 100 about the same point P as the adjustment arm 203. The sealing bed roller 32 is rotatably mounted to the lower arm 202.

The sealing mechanism is shown in the closed position without preheating in FIG. 13. Before the film 14 can be sealed, it must be threaded through separated rollers 30, 32. Similar to the example shown in FIGS. 10-12, the upper arm 201 is rotatably attached to upper arm gear 240. The upper arm gear 240 can be locked by an upper lock 206 so that it is fixed with respect to upper arm 201. During normal operation of the mechanism, the upper arm 201 is locked to the upper arm gear 240 by tightening the upper lock 206. A lower arm gear 242, which is in engagement with upper arm gear 240, is fixedly mounted to the lower arm 202.

To thread the film 14, rollers 30 and 32 are separated by activating hydraulic cylinder 138, which pulls the lower arm 202 down. This causes lower arm gear 242 to rotate counterclockwise. The rotation of the lower arm gear 242 causes the upper arm gear 240 to rotate clockwise because the gears are engaged. Since the upper arm gear 240 is locked to the upper arm 201, the upper arm also rotates clockwise, lifting the heated sealing roller 32. Consequently, by activating hydraulic cylinder 138, the sealing bed roller 32 is lowered and the heated sealing roller 30 is raised, creating room for the film 14. Once the film 14 is in place, the process is reversed such that the sealing bed roller 32 and heated sealing roller 30 are adjacent each other. A pressure spring 143 connects the hydraulic cylinder 138 to the lower arm 202, limiting the force that the cylinder exerts on the lower arm.

The cylinder 138 is also activated when the first sensor 137 does not sense an item 19. In this way, the sealing rollers 30, 32 pull away from the film 14 and the film is not held overlong on the heated sealing roller 30, and thus the film is not burned. Once the second sensor 137 detects an item 19, the cylinder 138 pushes bed sealing arm 122 up which, as described above, causes the sealing rollers 30, 32 to come together.

The adjustment of angle "a" will now be described. To increase or decrease preheating, the angle "a" (between roller axis line 129 and the vertical axis) is increased or decreased by rolling the heated sealing roller 30 over the sealing bed roller 32 by rotating adjustment arm 203 about point P. The adjustment arm 203 is maintained at a given angular position by an adjustment lock 207 positioned within a slot 204 in the adjustment arm 203. The upper arm 201 is maintained in a given angular position with respect to the upper arm gear 240 by the upper lock 206 positioned in a slot 205 in the upper arm gear.

To adjust angle "a", the upper lock 206 and the adjustment lock 207 are opened. The adjustment plate 203 is now rotated about point P. As the adjustment plate 203 is rotated, slot 204 slides over the adjustment lock 207. Also, as the adjustment plate 203 rotates, upper arm 201 is displaced forward. Since upper lock 206 is unlocked, upper arm 201 is free to rotate with respect to upper arm gear 240 and gravity pulls the heated sealing roller 30 onto the sealing bed roller 32 and into the film path 105. If the sealing mechanism was used some other orientation, a spring or other biasing means could be used to keep the sealing rollers 30, 32 in contact. Once the roller axis line 129 is at the desired angle "a", the upper lock 206 and adjustable lock 207 are locked.

Figure 15:
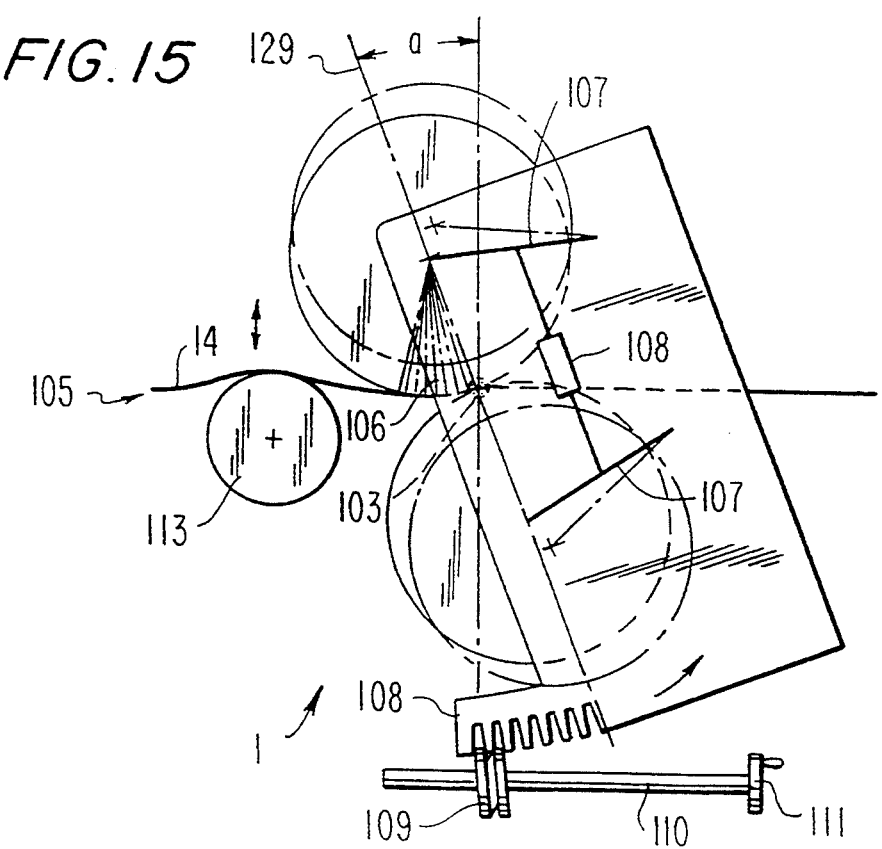
FIG. 15 is a side view of the third example of the sealing mechanism in the closed position with preheating.

In a third example of the present invention shown in FIGS. 14-15, the sealing rollers 30, 32 are rotatably mounted on roller arms 107 which, in turn, are pivotally mounted on a roller plate 104. The roller plate 104 is pivotally mounted to the sealing mechanism housing 100 such that it pivots about the sealing point 103. A worm gear 108 is mounted at the bottom of the roller plate 104. A worm 109 mounted on the housing is operably engaged to the worm gear 108. Worm shaft 110 is attached to the worm 109. Handcrank 111 is attached to the worm shaft 110. When the handcrank 111 is rotated, worm shaft 110 rotates worm 109 which, in turn, drives worm gear 108. Driving the worm gear 107 causes the roller plate 104 to rotate about the sealing point 103, thus changing the angle a. The handcrank 111 could be replaced by a computer-controlled motor (not shown) to control the rotation of roller plate 104.

As shown in FIG. 15, the bias roller 113, which in this embodiment is slidingly mounted on the housing, can be translated into the film path 105, pushing the film 14 upwards in the direction of the heated sealing roller 30. This causes the film 14 to lie on the heated roller 30 for a larger portion 106, thereby increasing preheating without changing the angle of the roller axis line 129. Further, the bias roller 113 also can be heated to further increase preheating.

Before the film 14 can be sealed, it must be threaded into the seal mechanism. An air cylinder 118 is operably engaged to the roller arms 107 such that when the cylinder is activated, it pushes the roller arms, causing them to pivot away from each other. This separates the sealing rollers 30, 32 (shown separated in phantom in FIGS. 14–15) so that the film 14 may be more easily inserted therebetween. To seal the film 14, the air cylinder 18 is closed, pulling the sealing rollers 30, 32 together again.

The air cylinder 118 is also actuated during operation when no item is sensed by the first sensor 137. This prevents film from being held within closed rollers 30, 32 while not being advanced, which may result in the film burning. Once an item is sensed by the first sensor 137, the cylinder 118 is closed and the rollers 30, 32 are brought together.

As seen in FIGS. 11 and 15, rotating the roller axis line 129 increases the angle a, causing the heated sealing roller 30 to be displaced into the film path 105. As a result of tension in the film 14, the film lies on the circumference of the heated sealing roller 30 for a portion 106 (shaded) before the sealing point 103. The film 14 is being preheated as it is in thermal contact with the heated sealing roller 30. The larger the angle a, the more the film 14 is preheated, resulting in a wider seal of higher quality. If a thinner seal is desired or if a seal of lesser quality is adequate, the roller axis line 129 can be rotated so that angle a is decreased (i.e., roller axis line 129 is moved towards vertical), which results in decreased preheating. Angle a is preferably maintained at or below 22° so that the film 14 is not subjected to undue stress.

In the preferred embodiment, the sealing section 28 is height adjustable to adjust to different package heights, enabling sealing of the film 14 at the midpoint of the height of the package. The sealing section 28 is also laterally adjustable to accommodate different package widths.

In some applications, such as high speed wrapping, merely running the film 14 on the portion 106 of the heated sealing roller 30 will not result in sufficient preheating. Consequently, the bias roller 113 can also be heated. To increase preheating even further, a series of additional heated rollers 147 can be cascaded, as seen in FIG. 16, each heated roller preheating the film 14 over a portion 106 (shaded) of its surface. If further heating is required, the sealing bed roller 32 can also be heated. The primary heated sealing roller 30 can still be adjusted to affect the width and quality of the seal. The additional heated rollers 147 can be heated in any combination, heating some or all, as any given seal requires. The amount of preheating delivered by each additional heated roller 147 can be altered by moving it toward and away from the film path in the same manner as heated sealing roller 30. If sufficient preheating is achieved by the heated rollers, the sealing bed roller 32 can be chilled to assist in curing the seal.

Referring again to FIGS. 3–5, when the machine 10 is used for MAP packaging, a gas nozzle 46 is placed between the layers of film 14, ending at a point slightly downstream from the longitudinal seal section 28. As shown in FIG. 4, the gas nozzle 46 is connected to a gas flush system 48. The nozzle 46 and flush system 48 flush the air out of the tube formed by the longitudinally sealed layers of film 14, and distribute $CO_2$, $NO_2$, or other suitable "inert" gas into the tube to a predetermined level, in a well known manner. The type of gas used depends on the characteristics of the barrier film used and the type of product being packaged.

A cross sealer, indicated generally at 50, is disposed downstream from the gas nozzle 46. The cross sealer 50 is of the box motion type, meaning it moves downstream with the packages being sealed while it forms a cross seal, so as not to interrupt the flow of the machine 10. After the cross seal is formed, the cross sealer 50 moves upstream to start the next cross seal. Before encountering the cross sealer 50, the packages are transferred from the conveyor belt 25 to a second conveyor belt 52 which is mounted to the cross sealer 50 on rollers 54. The rollers 54 move back and forth with the cross sealer 50, allowing the conveyor belt 52 to move the packages downstream to the cross sealer 50 while accommodating the back and forth movement of the latter, in a well known manner.

Figure 17:
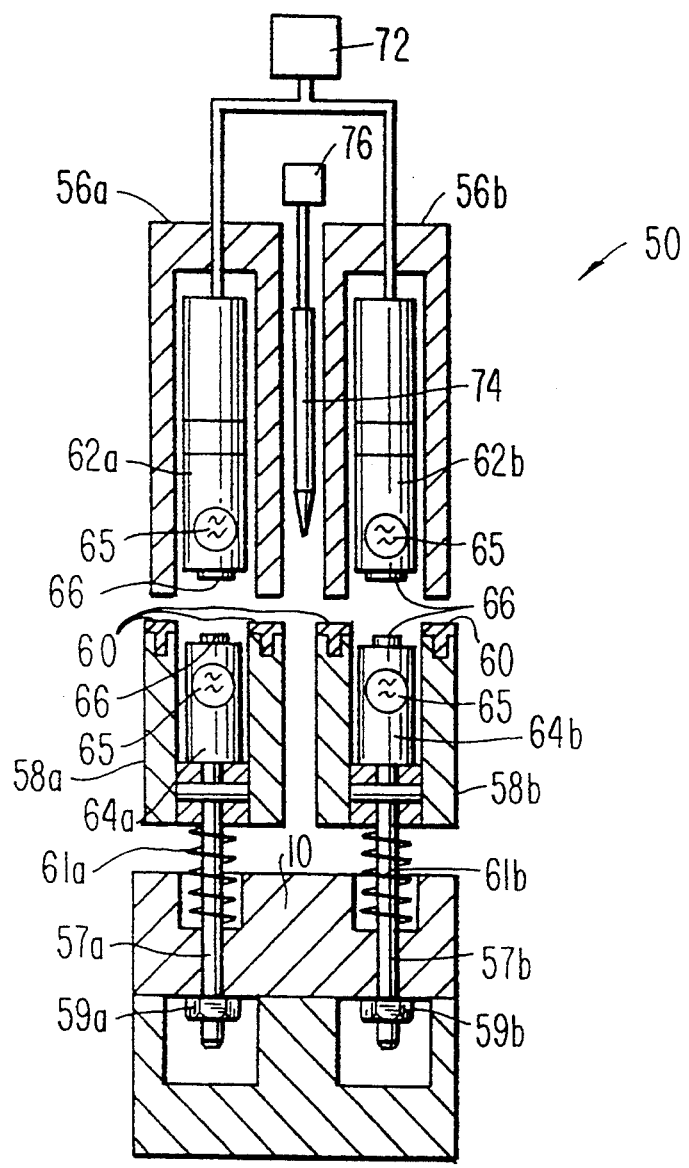
FIG. 17 is a view in cross section of the cross sealer used in the form fill packaging and sealing apparatus of FIG. 3.

Referring now to FIG. 17, which shows the cross sealer 50 in more detail, the cross sealer 50 comprises a pair of upper U-shaped seal bars 56a and 56b, and a pair of lower U-shaped seal bars 58a and 58b. Rods 57a and 57b extend from the bottom of seal bars 58a and 58b, respectively, into the machine 10. Springs 61a and 61b are mounted between the seal bars 58a and 58b and the machine 10 on the rods 57a and 57b. Cross pieces 59a and 59b are mounted on the ends of the rods 57a and 57b to limit the movement of the latter. Rubber grippers 60 are installed on the edges of the lower seal bars 58a and 58b. Sealing element assemblies 62a and 62b are mounted in the upper seal bars 56a and 56b, and sealing element assemblies 64a and 64b are mounted in the lower seal bars 58a and 58b. Each of the sealing element assemblies has a cooling passage 65 through which flows cooling liquid.

Sealing elements 66, comprising nichrome ribbons in the preferred embodiment, are disposed in opposing relationship on each of the element assemblies 62a,b and 64a,b. Each sealing element 66 is spring loaded at the ends of the element assembly upon which it is mounted (spring loading not shown), to allow for thermal expansion of the elements 66 during sealing. The sealing elements 66 are coated with a suitable material, such as TEFLON, to keep them from sticking to the film 14 during sealing. Preferably, a film (not shown) made of polyamide or other suitable material is placed between the sealing elements 66 and the element assemblies 62a,b and 64a,b. Polyamide film electrically insulates the elements 66 from the element assemblies 62a,b and 64a,b, but thermally conducts, allowing the element assemblies to act as heat sinks to cool the elements 66 quickly in order effectively to carry out impulse sealing.

In operation, vertical motion is imparted to the upper seal bars 56a and 56b in a well known manner to lower them onto the lower seal bars 58a and 58b, such that the edges of the upper seal bars 56a and 56b abut the grippers 60 and push the lower seal bars 58a and 58b downward slightly against the springs 61a and 61b, until the grippers 60 are approximately level with the top of the lower sealing element assemblies 64a and 64b. The seal bars 56a,b and 58a,b are now in sealing position. An air cylinder assembly 72 is attached to the upper element assemblies 62a and 62b to press them against the lower element assemblies 64a and 64b, thus pressing the elements 66 together, sealing the film between them.

A blade 74 is vertically disposed between the upper seal bars 62a and 62b for cutting the film between the seal bars after sealing is completed. An air cylinder assembly 76 is attached to the blade 74 to lower and raise the latter. Preferably, a proximity switch or like device (not shown) is provided to keep the upper element assemblies 62a and 62b from inadvertently pressing against the lower element assemblies 64a and 64b before the seal bars 56a,b and 58a,b are in sealing position, as is known in the art.

Referring again to FIGS. 3–5, a presser 78 is disposed downstream from the cross sealer 50 to press out the excess gas in the package just before the rear cross seal is made. The presser 78 is especially desirable in MAP packaging. Since the package is sealed hermetically in MAP applications, there is no way for excess gas to escape while the film is being shrunk around the package in a heat shrink tunnel or like device.

As mentioned above, if the machine 10 is used for MAP packaging or other packaging using heat shrink film, a heat shrink tunnel 200 is provided at the end of the machine 10. If the machine 10 is used with stretch or stretch/shrink film, the excess film from the front and rear of the package is folded around the product, as is known in the art. When used with stretch or stretch/shrink films, the machine 10 produces a hermetically sealed leakproof package without the need for large flaps to be folded under the product. Relatively small flaps may therefore be used, which are folded under solely for the sake of appearance. The machine 10 thus uses less film than typical stretch or stretch/shrink film sealing machines, which results in corresponding savings.

In operation of the machine 10, the film 14 is dispensed from the roll of film 16 by the dispenser 12, and goes through the film forming plow 22 where it is oriented to receive an item 19. The film sealing mechanism 1 is in the open position. When the second sensor 136 detects item 19, the sealing rollers 30, 32 and bias roller 113 begin rotating, and the heated sealing roller 32 is heated. The lug conveyor 24 places the item 19 between the film layers. When the item 19 is sensed by the first package sensor 137, the film dispenser 12, roller guide 26, and conveyor 25 are activated and film 14 starts feeding. Further, the heated sealing roller 30 and the sealing bed roller 32 of the heat sealing mechanism 1 are closed onto the film.

The item 19 and attending film 14 are then conveyed by the conveyor 25 to the longitudinal seal section 28, where the roller guide 26 catches the free edges of the film 14 at the side of the item 19 and pulls the film 14 taut. The edges then enter the sealing roller 30 and sealing bed roller 32, where they are heat sealed together at sealing point 103. When preheating is desired, the heat sealing roller 32 is moved into the film path 105 and the edges are pressed onto the heated sealing roller before reaching the sealing point 103. The heat sealing roller 32 is prevented from contacting the film 14 around the item 19 due to the cooling shield 101. The seal is quickly cooled by the cooling plate 45, cooling roller 43 and the cooling roller assembly 44 to approximate impulse sealing. A sealed tube of film 14 is thus formed, and the gas nozzle 46 supplies inert gas while flushing the air out of the tube.

The item 19 and film 14 are then conveyed to the cross sealer 50 where the film 14 in front of the item 19 is sealed. The upper seal bars 56a and 56b are lowered into sealing position onto the lower seal bars 58a and 58b, and the air cylinder assembly 72 presses the upper element assemblies 62a and 62b against the lower element assemblies 64a and 64b, pressing the layers of film 14 between the upper and lower sealing elements 66, which are cool when they are first brought together. The elements are then pulsed for a preset duration (preferably between 50 and 500 milliseconds, depending on the speed that the objects are moving through the machine 10 and the type of film used) and allowed to cool, and the element assemblies 62a,b and 64a,b and seal bars 56a,b and 58a,b are separated after the blade 74 cuts the film 14 between the seals. The item 19 then moves through the cross sealer 50, and just before the rear cross seal is made, the presser 78 presses the excess gas out of the package.

After the sealing of the package is complete, the package is conveyed to a heat shrink tunnel 200 or to apparatus for folding the front and rear flaps of film against the package, depending on whether shrink film or stretch film is used.

When an item 19 has not been sensed by first sensor 137 or the second sensor 136 for a period of time (normally the period of one wrapping cycle), the film dispenser 12 stops dispensing film 14. Rollers 26, 30, 32 and 113 stop pulling film. The film sealing mechanism i is opened so that the heated roller 30 does not melt the film 14 which has stopped moving. The machine 10 waits in this condition until an item 19 is sensed.

The foregoing description is not meant to limit the invention to the specific embodiments described. Other embodiments and variations of the invention will be apparent to those skilled in the art. Although described by reference to MAP, shrink, stretch, and stretch/shrink film applications, the invention can be used in other sealing applications involving heat sealing film where the width of the seal is affected by altering the amount of preheating before sealing.

I claim:

1. A mechanism for heat sealing film traveling from upstream to downstream along a film path comprising:
   a housing;
   a plate pivotally mounted on the housing;
   a worm gear operably engaged to the plate for pivoting the plate;
   a heated sealing roller rotatably mounted on the plate;
   a sealing bed roller rotatably mounted on the plate adjacent to the heating roller such that film passing between the heating roller and the bed roller is pressed together;
   wherein, when the plate is pivoted, the heated sealing roller is displaced into the film path.

2. The mechanism of claim 1 further comprising a bias roller slidably mounted on the housing along the film path upstream of the heated roller wherein sliding the bias roller can displace the film into the heated sealing roller.

3. The mechanism of claim 2 wherein the bias roller is heated.

4. The mechanism of claim 1 wherein the sealing bed roller is chilled.

5. The mechanism of claim 1 further comprising a cooling means disposed downstream of the heated sealing roller.

6. The mechanism of claim 5 wherein the cooling means comprises a cooling plate, a cooling roller, and a cooling roller assembly.

7. The mechanism of claim 1 further comprising cascading heated sealing rollers disposed upstream of the sealing bed roller.

8. The apparatus of claim 1 wherein the plate pivots about the point where the heated sealing roller contacts the sealing bed roller.

9. An apparatus for sealing film traveling along a film path comprising:
 a housing;
 a first arm attached to the housing;
 a heated roller having a center rotatably mounted on the first arm;
 a second arm attached to the housing;
 a bed roller having a center rotatably mounted on the second arm;
 means for pivoting the first arm and the second arm such that the heated roller and the bed roller are disposed adjacently and the film is disposed between the rollers; and
 a screw operably engaged to the first arm capable of displacing at least the first arm, thereby moving the heated roller a selected distance into the film path.

10. The apparatus of claim 9 further comprising an air cylinder capable of pivoting at least the first arm such that the heated roller and bed roller are remote from each other.

11. The apparatus of claim 9 further comprising a bias roller disposed along the film path capable of displacing the film into the heated roller.

12. A film sealing packaging apparatus for wrapping items in heat sealable film comprising:
 a film dispenser;
 a film forming means for forming the film into a tube by drawing edges of the film together;
 a conveyor for inserting items into the tube;
 a sealing mechanism for sealing the edges of the film comprising:
 a housing;
 a heated sealing roller rotatably mounted to the housing;
 a sealing bed roller rotatably mounted on the housing adjacent to the heated sealing roller;
 means for applying a variable amount of heat to the edges of said film prior to sealing the edges of said film; and
 a cross sealer.

13. The apparatus of claim 12 wherein the sealing mechanism further comprises a means for separating the heated sealing roller and the sealing bed roller.

14. The apparatus of claim 13 further comprising a sensor that detects an item to be wrapped and activates the separating means if no item is detected.

15. The apparatus of claim 12 further comprising a bias roller disposed upstream of the heated sealing roller capable of biasing film into the heated sealing roller.

16. The apparatus of claim 15 wherein the bias roller is heated.

17. The apparatus of claim 12 further comprising a cooling means disposed downstream of the heated sealing roller for cooling the film after it is sealed.

18. The apparatus of claim 17 wherein the cooling means comprises a cooling plate and a cooling roller.

19. The apparatus of claim 12 wherein the means for applying a variable amount of heat includes means for moving the heated sealing roller so that the amount of preheating is adjustable.

20. A method of sealing films with seals of adjustable width comprising the steps of:
 disposing at least two films to be sealed adjacent to one another;
 inserting the films between at least one heated sealing roller and at least one sealing bed roller wherein centers of the heated sealing roller and the sealing bed roller define a roller axis line;
 sealing the films by applying pressure and heat between the heated sealing roller and the sealing bed roller; and
 rotating the roller axis line such that the films are preheated before sealing.

21. The method of claim 20 further comprising the steps of running the film over a bias roller before insertion between the sealing rollers.

22. The method of claim 21 wherein the bias roller is heated.

23. The method of claim 22 wherein the sealing bed roller is chilled.

24. The method of claim 20 further comprising the step of chilling the seal soon after it is formed.

25. The method of claim 20 further comprising the step of inserting the films between cascading heated sealing rollers before sealing.

26. The method of claim 20 further comprising the steps of:
 separating the heated sealing roller from the sealing bed roller;
 sensing an item;
 inserting the item between the films; and
 moving the heated sealing roller and the sealing bed roller together.

27. The method of claim 20 further comprising the step of cutting the film on one side of the seal.

28. A mechanism for sealing heat-sealable film moving along a film path comprising:
 at least one heated sealing roller;
 at least one sealing bed roller disposed adjacent to the heated roller such that film passing between the rollers is pressed together and heated; and
 means for displacing the heat sealing roller into the film path such that the film lies on the heated sealing roller for a selected portion before the film is sealed.

29. The sealing mechanism of claim 28 further comprising a means for separating the heated sealing roller and the sealing bed roller.

30. The sealing mechanism of claim 29 wherein the means for separating comprises:
 a first arm on which the heated sealing roller is mounted;
 a second arm on which the sealing bed roller is mounted; and
 means for rotating the first arm and the second arm.

31. The film sealing mechanism of claim 28 further comprising a cooling means for cooling the film immediately after the film is sealed.

32. The film sealing mechanism of claim 31 wherein the cooling means comprises a cooling plate and a cooling roller.

33. The film sealing mechanism of claim 31 wherein the cooling means comprises a cooling roller assembly.

34. The film sealing means of claim 28 further comprising a film biasing roller disposed upstream of the heated sealing roller for biasing the film into the heated sealing roller.

35. The film sealing means of claim 28 wherein the means for displacing the roller axis line comprises a roller plate mounted to a housing.

36. A method of packaging items in heat-sealable film comprising the steps of:
 dispensing film;
 drawing edges of the film together to form a tube;
 transporting the edges of the film along a film path;
 inserting items in the tube;

sealing the edges of the film by pressing them together at a sealing point between at least one heated sealing roller and at least one sealing bed roller;

displacing the heated sealing roller into the film path thereby causing the film to contact the heated sealing roller for a distance before the sealing point.

37. A method of claim 36 further comprising the steps of passing the edges of the film between cascading heated sealing rollers.

38. A method of claim 36 wherein the sealing bed roller is chilled.

39. A method of claim 36 further comprising the step of passing the edges of the film over a heated bias roller.

40. A method of claim 39 further comprising the step of translating the bias roller into the film, thereby biasing the film towards the heated sealing roller.

41. A hermetic sealing and packaging apparatus comprising:

a film dispenser a film-forming means for forming film into a tube by drawing the edges of the film together;

a longitudinal seal section for hermetically sealing the edges by pressing them between a heated sealing roller and a sealing bed roller;

a roller axis line defined by the center of the heated sealing roller and the center of the sealing bed roller;

a means for displacing the roller axis line;

a hermetic cross-sealer; and a gas nozzle for blowing a selected gas into the tube.

42. The apparatus of claim 41 further comprising a cooling shied disposed adjacent to the heated sealing roller.

43. The apparatus of claim 42 further comprising a cooling plate mounted on the cooling shield for cooling the edges after they are sealed.

44. The apparatus of claim 41 wherein the means for displacing the roller axis line comprises a plate on which the heated sealing roller and the sealing bed roller are mounted and a gear for pivoting the plate.

45. The apparatus of claim 41 further comprising cascading heated sealing rollers disposed upstream of the sealing bed roller.

46. The apparatus of claim 41 further comprising a bias roller disposed upstream of the heated sealing roller.

47. The apparatus of claim 46 wherein the bias roller is heated.

48. The apparatus of claim 41 wherein the sealing bed roller is chilled.

49. The apparatus of claim 41 further comprising a presser for pressing gas out of the tube.

* * * * *